United States Patent Office 2,857,387
Patented Oct. 21, 1958

2,857,387

N-(DIHYDROQUINOLINYL) CARBOXANILIDES

David J. Beaver, Richmond Heights, and Paul J. Stoffel, St. Louis, Mo., assignors to Monsanto Chemical Company, St. Louis, Mo., a corporation of Delaware No Drawing. Application November 2, 1956
Serial No. 619,967

6 Claims. (Cl. 260—287)

This invention relates to new and useful N-(dihydroquinolinyl) carboxanilides, specifically those of the structure

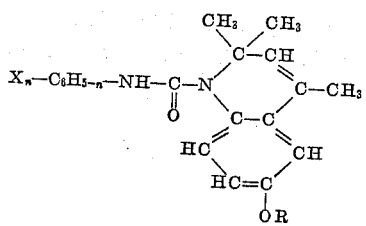

wherein $X_n$—$C_6H_{5-n}$— is a halogen substituted phenyl radical free of substituents ortho to the nitrogen atom, where X is a chlorine or bromine, where $n$ is a whole number from 2 to 3, and where R is an alkyl radical containing 1 to 5 carbon atoms, e. g. methyl, ethyl, propyl, butyl, amyl, and isomers thereof. As illustrative of the carboxanilides of this invention is the following:

N-(2,2,4-trimethyl-6-methoxy-1,2-dihydroquinolinyl) 3,4-dichloro-carboxanilide

N-(2,2,4-trimethyl-6-ethoxy-1,2 - dihydroquinolinyl) 3,4-dichloro-carboxanilide

N-(2,2,4-trimethyl-6-n-butoxy-1,2-dihydroquinolinyl) 3,4-dichloro-carboxanilide

N-(2,2,4-trimethyl-6-ethoxy-1,2 - dihydroquinolinyl) 3,5-dichloro-carboxanilide

N-(2,2,4-trimethyl-6-isoamyloxy-1,2 - dihydroquinolinyl) 3,5-dichloro-carboxanilide N-(2,2,4-trimethyl-6-ethoxy-1,2-dihydroquinolinyl) 3,4,5-trichloro-carboxanilide N-(2,2,4-trimethyl-6-ethoxy-1,2 - dihydroquinolinyl) 3,4-dibromo-carboxanilide The carboxanilides of this invention are prepared by reacting a 2,2,4-trimethyl-6-alkoxy-1,2-dihydroquinoline with an isocyanate of the formula $$X_n-C_6H_{5-n}-N=C=O$$

in the presence of an inert organic solvent, and as illustrative of the preparation of these compounds is the following:

Example I

To a suitable reaction vessel is added and intimately mixed 9.4 parts by weight of 3,4-dichlorophenylisocyanate, 10.8 parts by weight of 2,2,4-trimethyl-6-ethoxy-1,2-dihydroquinoline and 40 parts by weight of diethyl ether. The mass is agitated at room temperature for about 24 hours and filtered. The filter cake is dried and identified as N-(2,2,4-trimethyl-6-ethoxy-1,2-dihydroquinolinyl) 3,4-dichloro-carboxanilide, a white solid melting at 139.3–140.2° C.

Example II

Employing the procedure of Example I but replacing 3,4-dichlorophenylisocyanate with an equal weight of 3,5-dichlorophenylisocyanate, there is obtained N-(2,2,4-trimethyl-6 - ethoxy-1,2 - dihydroquinolinyl) 3,5 - dichloro-carboxanilide.

Example III

Employing the procedure of Example I but replacing 3,4-dichlorophenylisocyanate with a chemically equivalent weight of 3,4,5-trichlorophenylisocyanate, there is obtained N-(2,2,4-trimethyl-6-ethoxy-1,2-dihydroquinolinyl) 3,4,5-trichloro-carboxanilide.

Example IV

Employing the procedure of Example I but replacing 2,2,4-trimethyl - 6 - ethoxy-1,2 - dihydroquinoline with a chemically equivalent weight of 2,2,4-trimethyl-6-methoxy-1,2-dihydroquinoline, there is obtained N-(2,2,4-trimethyl-6-methoxy-1,2 - dihydroquinolinyl) 3,4 - dichloro-carboxanilide.

Example V

Employing the procedure of Example I but replacing 2,2,4 - trimethyl - 6 - ethoxy - 1,2 - dihydroquinoline with a chemically equivalent weight of 2,2,4-trimethyl-6-isoamyloxy-1,2-dihydroquinoline, there is obtained N-(2,2,4-trimethyl-6-isoamyloxy-1,2-dihydroquinolinyl) 3,4-dichloro-carboxanilide.

The compounds of this invention are particularly useful in controlling bacterial growth, particularly *Micrococcus pyogenes* var. *aureus*. In this regard the carboxanilides when compounded with a detergent soap (i. e. an alkali metal salt of a higher fatty acid of animal or vegetable origin, such as stearic acid, lauric acid, palmitic acid, oleic acid, linoleic acid, ricinoleic acid, and the lke, or mixtures thereof obtained from tallow, lard, coconut oil, palm oil, castor oil, olive oil, cottonseed oil, and the like) provide highly useful antiseptic detergent soap compositions.

In order to illustrate the activity of the carboxanilides of this invention several were incorporated in an alkali metal fatty acid soap [specifically a mixture of alkali metal salts of fatty acids whose fatty acid content analyzes

| | Percent |
|---|---|
| Oleic and linoleic acid | About 46 |
| Stearic acid | About 14 |
| Palmitic acid | About 30 |
| Lower fatty acids (myristic, lauric, etc.) | About 10] | in a weight ratio of one part to 50 parts soap. Aliquots of each were added to a Sabourard's dextrose agar medium so as to give concentrations in parts per million as set forth below. The agar in each case was then poured into a petri dish, allowed to harden and then inoculated with a standard culture of *Micrococcus pyogenes* var. *aureus* of standard resistance. The incubation in each instance was made at 37° C. for 48 hours. The extent of growth is noted below:

| Compound/Concentration, p. p. m. | 1,000 | 100 | 10 |
|---|---|---|---|
| N - (2,2,4-trimethyl-6-ethoxy-1,2-dihydroquinolinyl) 3,4-dichlorocarboxanilide | none | none | none |

The same control of *Micrococcus pyogenes* var. *aureus* is obtained by replacing N-(2,2,4-trimethyl-6-ethoxy-1,2-dihydroquinolinyl) 3,4-dichloro-carboxanilide in the foregoing detergent soap composition with an equal weight of N-(2,2,4-trimethyl - 6 - ethoxy - 1,2 - dihydroquinolinyl) 3,5-dichloro-carboxanilide, N-(2,2,4 - trimethyl-6-ethoxy-1,2-dihydroquinolinyl) 3,4,5-trichloro-carboxanilide, and N-(2,2,4-trimethyl-6-methoxy-1,2-dihydroquinolinyl) 3,4-dichloro-carboxanilide.

Relatively small amounts of these carboxanilides in a detergent soap composition have been found to yield effective antiseptic detergent soap compositions. Amounts as low as 0.5 to 1% by weight based on the weight of the detergent soap have proved satisfactory. However, it is preferred to employ these carboxanilides in amounts in the order of 1 to 5% by weight based on the detergent soap. While larger amounts, as for example up to 10% by weight, may be employed the upper limit will be determined by practical considerations. Various colors, antioxidants, perfumes, water softeners, emollients, and the like, may be included where desirable in detergent compositions containing the compounds of this invention. The term "soap" or "detergent soap" as used herein is employed in its popular or ordinary meaning, i. e. those cleansing compositions prepared from an alkali metal compound such as potassium or sodium hydroxide and a fat or fatty acid, both saturated and unsaturated.

While this invention has been described with respect to certain embodiments it is not so limited and it is to be understood that variations and modifications thereof obvious to those skilled in the art may be made without departing from the spirit or scope of this invention.

What is claimed is:
1. Compounds of the structure

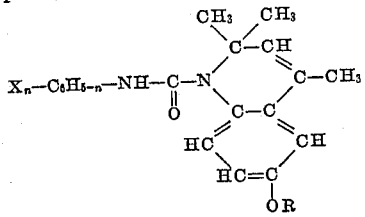

wherein $X_n$—$C_6H_{5-n}$— is a halogen substituted phenyl radical free of substituents ortho to the nitrogen atom, where X is a halogen atom selected from the group consisting of chlorine and bromine, where $n$ is a whole number from 2 to 3, and where R is an alkyl radical containing from 1 to 5 carbon atoms.

2. N - (2,2,4 - trimethyl - 6 - ethoxy - 1,2 - dihydroquinolinyl) 3,4-dichloro-carboxanilide.

3. N - (2,2,4 - trimethyl - 6 - ethoxy - 1,2 - dihydroquinolinyl) 3,5 dichloro-carboxanilide.

4. N-(2,2,4 - trimethyl - 6 - ethoxy - 1,2 - dihydroquinolinyl) 3,4,5-trichloro-carboxanilide.

5. N - (2,2,4 - trimethyl - 6 - methoxy - 1,2 - dihydroquinolinyl) 3,4-dichloro-carboxanilide.

6. N - (2,2,4 - trimethyl - 6 - isoamyloxy - 1,2 - dihydroquinolinyl) 3,4 - dichloro-carboxanilide.

References Cited in the file of this patent
UNITED STATES PATENTS
2,775,587    Fischback et al. _____ Dec. 25, 1956

OTHER REFERENCES
Henry et al.: J. Am. Chem. Soc., vol. 71, 1949, pages 2297–2300.